US005984572A

United States Patent [19]

Mitsui

[11] Patent Number: 5,984,572

[45] Date of Patent: Nov. 16, 1999

[54] VIBRATORY GENERATING MECHANISM AND VIBRATORY ROLLER UTILIZING VIBRATORY GENERATING MECHANISM

[75] Inventor: Akira Mitsui, Saitama, Japan

[73] Assignee: Sakai Heavy Industries, Inc., Tokyo, Japan

[21] Appl. No.: 08/987,386

[22] Filed: Dec. 9, 1997

[30] Foreign Application Priority Data

Dec. 12, 1996 [JP] Japan .................................... 8-332465

[51] Int. Cl.[6] ............................ E01C 19/28; F16H 33/00

[52] U.S. Cl. ................................ 404/117; 74/61; 404/130

[58] Field of Search .................................... 404/117, 130; 74/61

[56] References Cited

U.S. PATENT DOCUMENTS 5,618,133 4/1997 Mitsui et al. ........................... 404/117

FOREIGN PATENT DOCUMENTS 1018538 1/1953 France .................................. 404/117
53-136773 11/1978 Japan .
5-42307 6/1993 Japan .
7-197414 8/1995 Japan .

*Primary Examiner*—James A. Lisehora

*Attorney, Agent, or Firm*—Liniak, Berenato, Longacre & White

[57] ABSTRACT

To be able to start and stop vibration without resonating a vibratory body as well as to prevent a drawback of a conventional technology in which when a vibration generating shaft is rotated at a high speed, a torsional coil spring is worn by being brought into abrasive contact with a bent support member and a receiving seat and a large sound is generated when a main weight returns in an axial direction of the vibration generating shaft, there is provided a vibratory generating mechanism having a movable eccentric weight 4 rotatable around a pivoting shaft 3, a sliding member 11 capable of linearly moving on the axial line of the vibration generating shaft along a guide member 6 at one end of the vibration generating shaft, a connecting rod 12 one end of which is connected to the sliding member and other end of which is connected to the movable eccentric weight for transforming a displacement of a linear movement of the sliding member into a displacement of a rotational movement around a pivoting shaft of the vibration generating shaft, a stopper 14 for restricting a range of pivoting the movable eccentric weight to an angle nullifying an amount of eccentricity of the vibration generating shaft only from one side and a pressing member 13 such that the amount of eccentricity of the vibration generating shaft is nullified.

7 Claims, 13 Drawing Sheets

1A
1B
1C
1D
57,57'
58,58'
56
55
57'
58'
58
57
58' 57'

9 A

9 B

10A

10B

11 A

11 B

VIBRATORY GENERATING MECHANISM AND VIBRATORY ROLLER UTILIZING VIBRATORY GENERATING MECHANISM

BACKGROUND OF THE INVENTION

1. Field of the Invention

The present invention relates to a vibratory generating mechanism which starts and stops the vibration without resonating the mechanical system including the vibratory generating mechanism.

2. Prior Art

One of the vibratory generating mechanism to be utilized in vibration type compactors such as vibratory rollers, vibratory pile driver and other vibratory machines is generating the vibration by rotating a vibration generating shaft having an eccentric weight with a hydraulic motor for generating vibration.

Second type of the vibratory generating mechanism is capable of switching the amplitude of the vibration by changing the rotating direction of the vibration generating shaft, which is shown in FIG. 1. As shown in FIG. 1, movable eccentric weight devices 57, 57' are provided at the both sides of a fixed eccentric weight devices 56. A vibration generating shaft 55 changes the rotating direction as the flow of the pressure oil to a hydraulic motor is switched. For example, when the vibration generating shaft 55 rotates in the forward direction, as shown in FIG. 1A and FIG. 1B, the eccentricity of the movable eccentric weight devices 57, 57' is opposite to that of the fixed eccentric weight device 56 of the vibration generating shaft 55, so that the vibration forces are canceled out and the amplitude of the vibration becomes low. On the other hand, when the vibration generating shaft 55 rotates in the reverse direction, as shown in FIGS. iC and ID, the eccentricity of the movable eccentric weight devices 57, 57' is the same as that of the fixed eccentric weight device 56, so that the vibration forces are composed and the magnitude of the vibration becomes high.

Third type of the vibration generating mechanism is a vibration force generating apparatus disclosed in the Japanese Utility Model Laid-open No. Hei 5-42307. This structure is that a pair of eccentric weights are disposed to the vibration generating shaft so as to be rotated in symmetry and that the vibration force due to the eccentric weights can be switched in multiple stages or variable number of stages by rotating the vibration generating shaft and changing the rotation angle of the eccentric weights.

The above-described conventional vibration generating mechanism has the following problems. In the first type vibration generating mechanism, the resonance is generated when the vibration generating shaft starts and stops, which affects the object to be vibrated such as the road surface. This example will be explained with a vibratory roller.

In a case of the vibratory roller, the compacting operation is performed by vibrating compacting wheels. If the compacting wheels are vibrated when the vibratory roller is stopped traveling, the road surface under the vibratory roller is sunk and the compacted surface becomes rough. In order to overcome this problem, the vibrating shaft is rotated to vibrate the compacting wheels, worked with a fore and aft traveling lever of a fore and aft travel control apparatus while the vibratory roller is traveling, and when the vibratory roller is stopped traveling, the vibrating shaft is stopped to terminate the vibration.

However, as shown in FIG. 2 that is a graph showing the change of the amplitude of the vibration of the compacting wheels until the rotation of the vibrating shaft is completely stopped after the number of revolution of the vibrating shaft of the vibratory roller is set, the compacting rollers are resonated when it reaches the resonance point and goes further beyond the resonance point of the compacting roller. Moreover, under some condition of the road surface to be compacted, the road surface may become slightly rough.

This problem is not limited to the vibratory roller. The above-described first type conventional vibratory apparatus have the same problem of the resonance when the vibrating shaft is started and stopped.

The above-described second type conventional vibratory apparatus have another problem besides the same problem as the first type conventional vibratory apparatus. Detent means 58, 58' formed at the movable eccentric weight devices 57, 57' are frequently damaged every time the rotating direction of the vibrating shaft 55 of FIG. 1 is switched since the ends of the detent means 58, 58' hit the fixed eccentric weight device 56. Further, in the third type conventional vibratory apparatus, some special driving apparatus such as a rack and pinion mechanism and hydraulic cylinder is needed to switch the eccentric amount. Therefore, the assembly is hard since the structure is complicated and the maintenance is also hard, which makes the cost of the apparatus high.

In order to overcome the above-described problems, the inventor of the present application invents a vibratory generating mechanism which is disclosed in Japanese patent Laid-open No. Hei 7-197414. As shown in FIG. 3, this vibratory generating apparatus comprises an axis 3' perpendicular to a vibration generating shaft 10' and a main weight 4' that is a movable eccentric weight around the axis 3', and it generates the vibration by rotating the vibration generating shaft 10'. The vibratory generating apparatus further comprises elastic members 13' for sandwiching members **48*a* at the body of the vibration generating shaft and members 4*d* at the main weight so that the center of gravity of the vibration generating shaft is placed on the axis of the vibration generating shaft, an axis 9' on the main weight 4', which differs from the axis 3', and a pilot weight 9' which is a small eccentric weight having the weight smaller than the main weight 4'. The vibratory generating mechanism changes the amplitude of the vibration by switching the rotating direction of the vibration generating shaft 10**'.

According to this vibratory generating mechanism, the pilot weight is rotated and moved relative to the main weight with the inertia force acting on the pilot weight of small mass, so that the main weight of large mass is rotated around the axis while the force acting on the main weight is not balanced. Therefore, this vibratory generating mechanism can start and stop the vibration without resonating the vibrating bodies with the vibratory generating mechanism such as rolls of the vibratory roller, which solves the above-described problems.

However, it was found that the improved vibratory generating mechanism still has the following problems. First, an elastic member 13' of torsion coil spring holds the members **48*a* at the body of the vibration generating shaft and the members 4*d* at the main weight between its ends 13*a*, 13*b* so that the center of gravity of the vibration generating shaft is placed substantially on the axis of the vibration generating shaft. Accordingly, when the vibration generating shaft 10' is rotated at high speed, plate frames 48, 48' for supporting both sides of the main weight 4' is distorted outward by a centrifugal force, and the torsion coil spring is pushed outward (toward end plates 4*e***) by the centrifugal force.

Therefore, the torsion coil spring wears between the distorted frames 48, 48' and the end plates 4*e*. This is because the frames 48, 48' cannot firmly be held from the outside since the bearings 49, 49' are needed between the frames 48, 48' and the axis 3' for the rotation of the axis 3' keyed to the main weight 4'. Second, both ends 13*a*, 13*b* of the coil spring hit the members 48*a* at the body of the vibration generating shaft and the members 4*d* at the main weight, alternatively, which generates the large sounds. Moreover, the main weight 4' is vibrated around the axis 3' and the vibration is hardly suppressed.

SUMMARY OF THE INVENTION

It is an object of the present invention to provide a vibration generating mechanism which starts and stops the vibration without resonating the vibrating bodies and which solves the above-described problems and a vibratory roller utilizing the vibration generating mechanism.

In order to achieve the above-described object, according to a first aspect of the present invention, there is provided a vibratory generating mechanism having a pivoting shaft in a direction orthogonal to an axial line of a vibration generating shaft, having a movable eccentric weight rotatable around the pivoting shaft and generating vibration by rotating the vibration generating shaft, the vibratory generating mechanism including a rotational driving device of the vibration generating shaft, a sliding member capable of moving linearly on the axial line of the vibration generating shaft along a guide member on one side of the vibration generating shaft, a connecting rod one end of which is connected to the sliding member and other end of which is connected to the movable eccentric weight for transforming a displacement of a linear movement of the sliding member into a displacement of a rotational movement around the pivoting shaft of the vibration generating shaft, a stopper for restricting a range of pivoting the movable eccentric weight to an angle nullifying an amount of eccentricity of the vibration generating shaft only from one side, and an elastic member interposed between the sliding member and the guide member for pressing the movable eccentric weight such that the amount of eccentricity of the vibration generating shaft is nullified.

According to a second aspect of the present invention, there is provided the vibratory generating mechanism according to the first aspect, wherein the elastic member is a coil spring.

Further, according to a third aspect of the present invention, there is provided the vibratory generating mechanism according to the first aspect or the second aspect, wherein the pivoting shaft for axially supporting the movable eccentric weight is fixed to span support frames arranged separately to oppose each other.

Further, according to a fourth aspect of the present invention, there is provided the vibratory generating mechanism according to any one of the first through the third aspect, wherein the movable eccentric weight constitutes a main weight and a pilot weight which is a small eccentric weight having a mass smaller than a mass of the movable eccentric weight is provided on the main weight.

Next, according to a fifth aspect of the present invention, there is provided the vibratory generating mechanism according to the fourth aspect, wherein the pilot weight is made pivotable in respect of the main weight and an amplitude of vibration is made variable by rotating the vibration generating shaft by switching a direction of rotating thereof.

Furthermore, according to a sixth aspect of the present invention, there is provided the vibratory generating mechanism according to the fifth aspect, wherein two stopper receivers having different lengths from a pivoting axial center thereof in a radius direction are provided, a stopper for engaging with the two stoppers is provided on the main weight and a stopper having a dimension capable of engaging only one of the two stopper receivers of the pilot weight is provided at the support frames axially and rotatively supporting the main weight.

Additionally, according to a seventh aspect of the present invention, there is provided a vibratory roller having the vibratory generating mechanism according to any one of the first through the sixth aspect.

BRIEF DESCRIPTION OF THE DRAWINGS

FIGS. 9A and 9B are views for showing a relationship among a main weight, a pilot weight and a stopper according to a second embodiment of a vibratory generating mechanism according to the present invention in which FIG. 9A is a side sectional view of a vibration generating body in a state where the main weight is disposed at a neutral position nullifying the amount of eccentricity of the vibration generating shaft and FIG. 9B is a sectional view taken from a line A—A of FIG. 9A;

FIGS. 10A and 10B are views showing the same relationship as in FIGS. 9A and 9B in which FIG. 10A is a side sectional view of the vibration generating body when vibration is provided with a low amplitude and FIG. 10B is a sectional view taken from a line B—B thereof;

FIGS. 11A and 11B are views showing the same relationship as in FIGS. 9A and 9B in which FIG. 11A is a side sectional view of the vibration generating body when vibration is provided with a high amplitude and FIG. 11B is a sectional view taken from a line C—C of FIG. 11A;

PREFERRED EMBODIMENTS OF THE PRESENT INVENTION

The preferred embodiments of the present invention will be described with reference to the accompanying drawings.

First Embodiment

Figure 1:
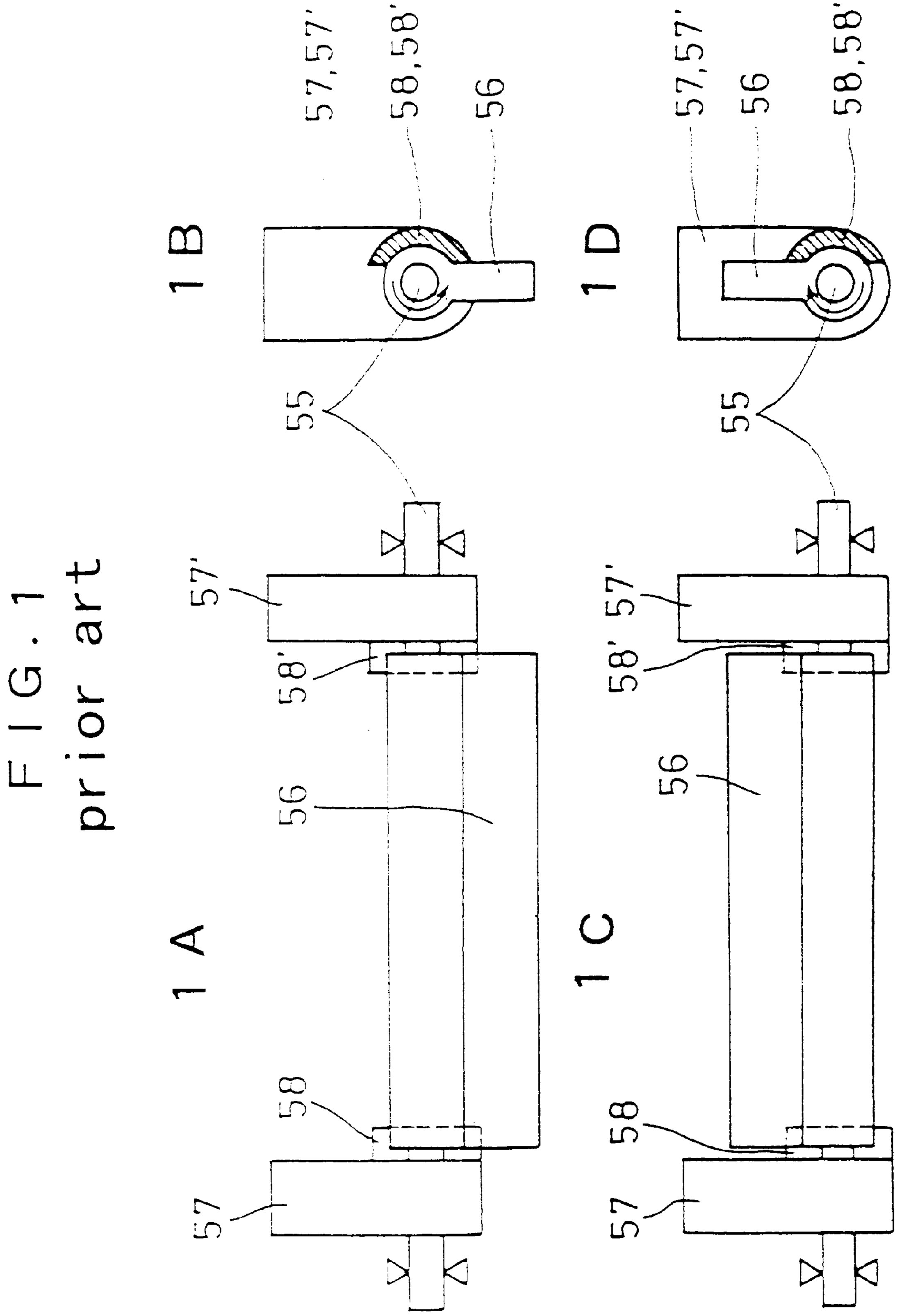
FIG. 1 prior art
FIGS. 1A and 1B are a front view and a cross sectional view at a low amplitude for explaining a conventional vibratory generating mechanism and FIGS. 1C and 1D are similarly, a front view and a cross sectional view at a high amplitude.
Figure 2:
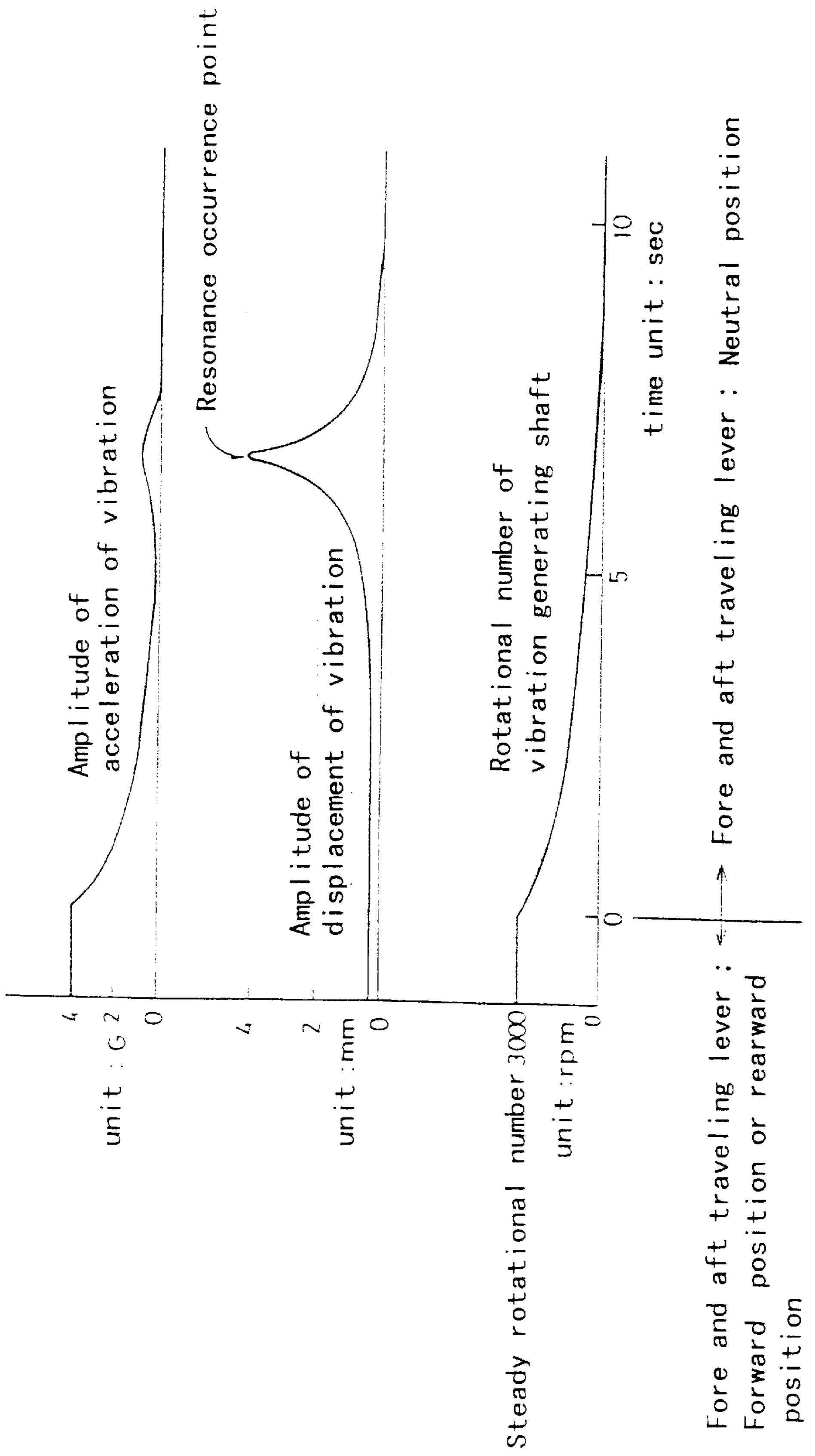
FIG. 2 prior art
FIG. 2 shows graphs indicating changes over time of a rotational number of a vibration generating shaft, an amplitude of displacement of vibration of a vibratory wheel and an amplitude of acceleration of vibration when a fore and aft travelling lever is operated from a forward position or a rearward position to a neutral position in a state where the vibration generating shaft is rotated in a steady state.
Figure 3:
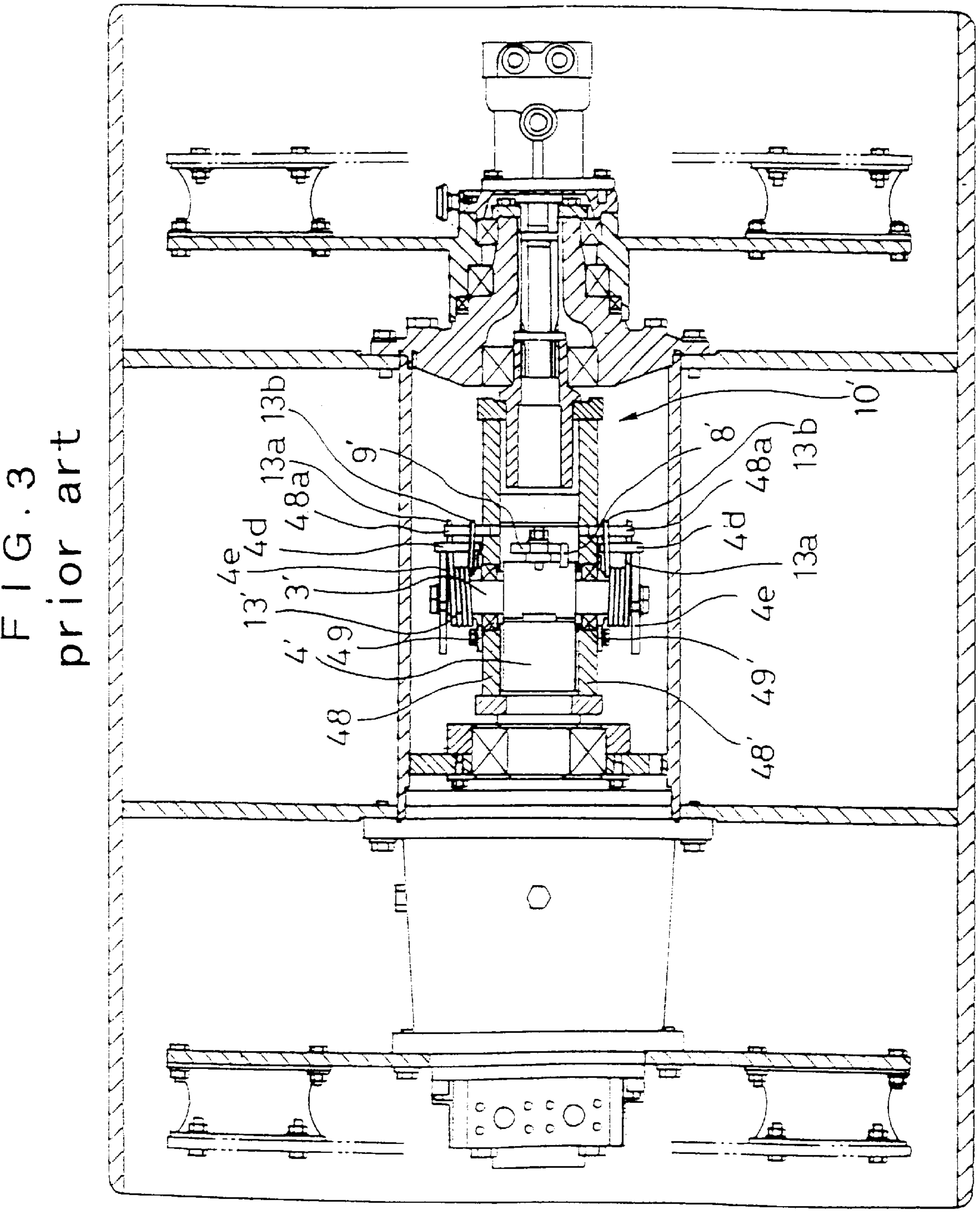
FIG. 3 prior art
FIG. 3 is a plan sectional view in which a conventional improved vibratory generating mechanism is used in a vibratory roller.
Figure 4:
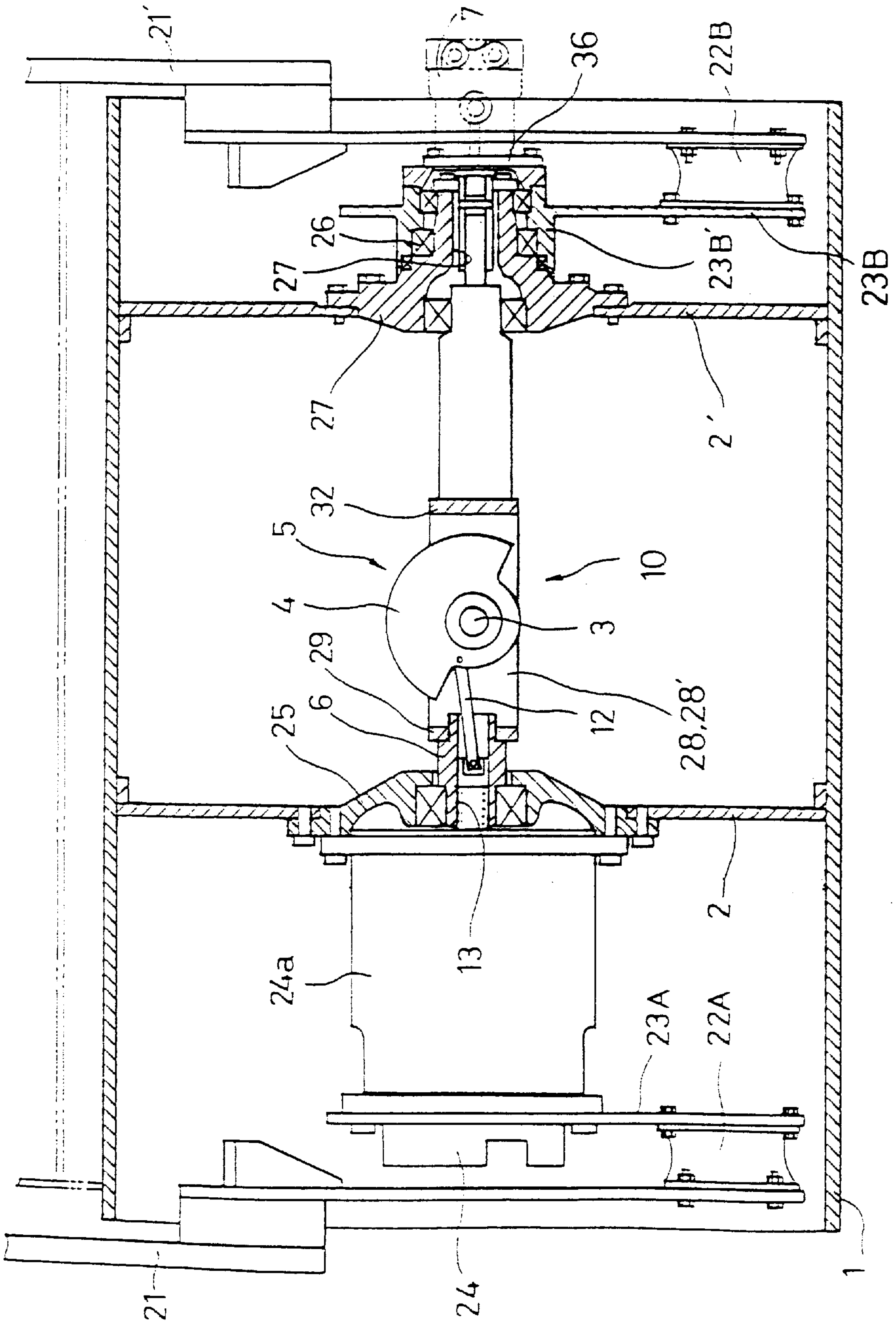
FIG. 4 is a side sectional view showing an embodiment of a vibratory generating mechanism according to the present invention when the vibratory generating mechanism is used in a vibratory roller.
Figure 5:
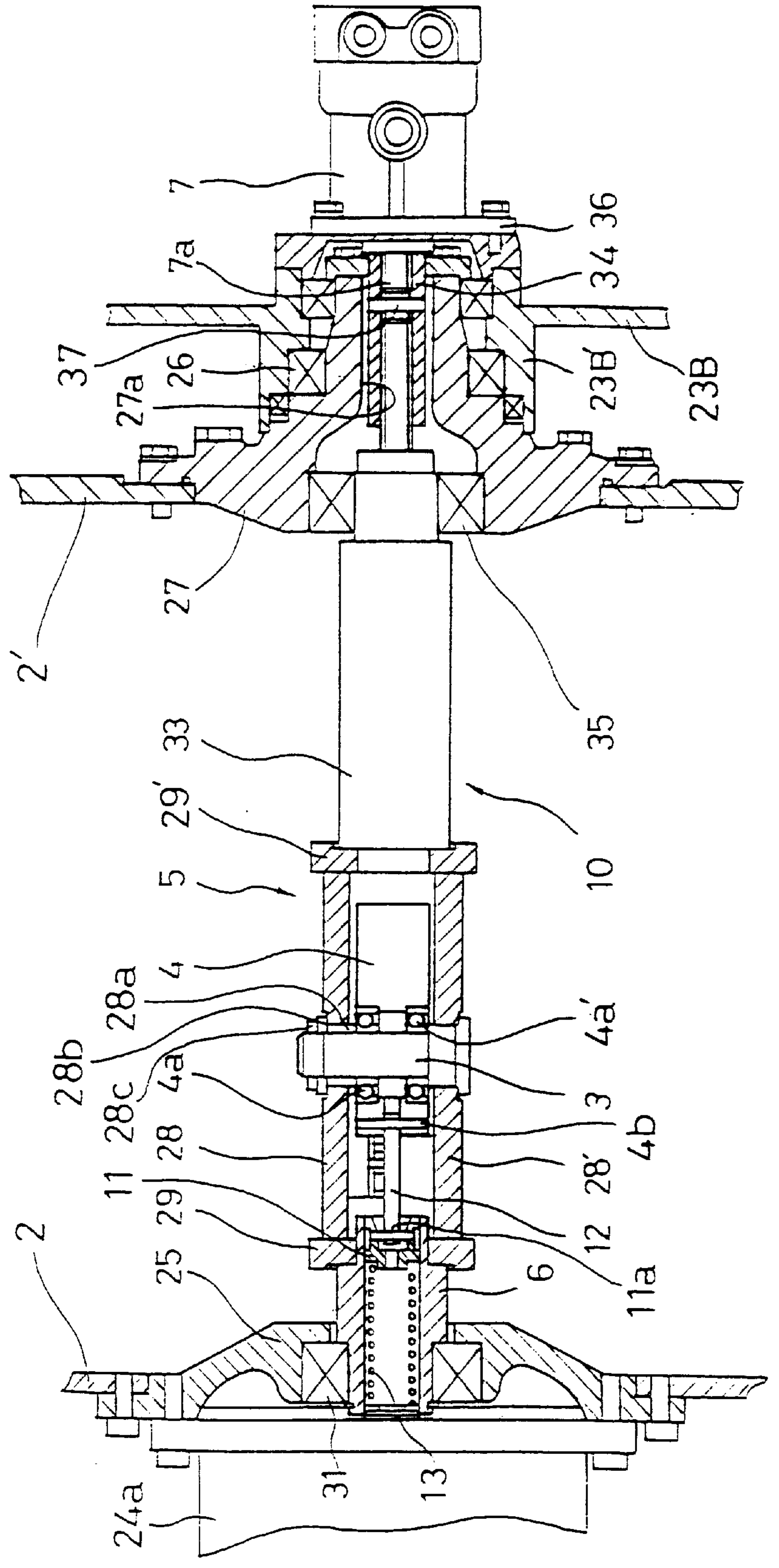
FIG. 5 is a plan sectional view illustrating to magnify a portion of the vibratory generating mechanism in FIG. 4.

FIG. 4 is a sectional view showing a vibration generating mechanism of a vibratory roller according to the first embodiment of the present invention. FIG. 5 is a plan sectional view showing the enlarged vivbration generating mechanism. As shown in FIG. 4, left and right mirror plates 2, 2' are placed apart from the other in a rotating wheel 1, and a vibration generating body 5 having a movable eccentric weight 4 is placed between the mirror plates 2, 2'. There are a support 23A attached to a left frame 21 with a vibration proof member 22A and a hydraulic motor with a reduction gear for traveling 24 is placed to the support 23A. Since a rotational driving unit 24*a* of the hydraulic motor with the reduction gear 24 is fixed to a supporting member 25 composed with the mirror plate 2 of the rotating wheel 1, the rotating wheel 1 is rotated by the rotation of a rotational driving unit 24*a*.

Further, there are a support 23B attached to a right frame 21' with a vibration proof member 22B and a supporting member 27 is attached to a bearing member 23B' of the support 23B with a bearing 26. The supporting member 27 having an axial hole 27*a* is fixed to the right mirror plate 2'.

As shown in FIG. 5, the vibration generating body 5 comprises two plate frames 28, 28' opposing to the other wit a certain space, a shaft 3 bridging the frames 28, 28', fixed by nuts 28*c* with washers 28*b*, and a movable eccentric weight 4 fixed to the shaft 3 with bearings 4*a*, 4*a*' between the frames 28, 28'. The ends of the frames 28, 28' are fixed with supporting members 29, 29', respectively. A cylindrical guide member 6 fixed to the left spporting member 29 is supported by the supporting member 25 composed by the left mirror plate 2 with a bearing 31. The right-hand supporting member 29' fixes one end of a shaft member 33. The shaft member 33 is supported by the supporting member 27 composed by the right-hand mirror plate 2' with a bearing 35, and it is inserted into the axial hole 27*a* of the supporting member 27. There formed a male spline at the end of the shaft member 33. A sleeve 34 having a female spline matched to the male spline of the shaft member 33 is fitted to the end of the shaft member 33.

A flange 36 of a hydraulic motor 7 for driving the vibration generating shaft as a driving apparatus for rotating the vibration generating shaft placed at the axis of the rolling wheel 1 is attached to one end of the bearing member 23B' of the right-hand support 23B. A male spline is formed at a driving shaft 7*a* of the hydraulic motor 7 for driving the vibration generating shaft, and it is inserted into the female spline of the sleeve 34. A positioning pin 37 is inserted into the sleeve 34 so that the sleeve 34 is not moved in the axial direction. The shaft member 33 and the driving shaft 7*a* of the hydraulic motor 7 for driving the vibration generating shaft are coupled by the spline coupling, and the rotational driving force of the hydraulic motor 7 is transmitted to the shaft member 33. Accordingly, the cylindrical guide member 6, the plate frames 28, 28' and the shaft member 33 constitute the vibration generating shaft 10.

Figure 6:
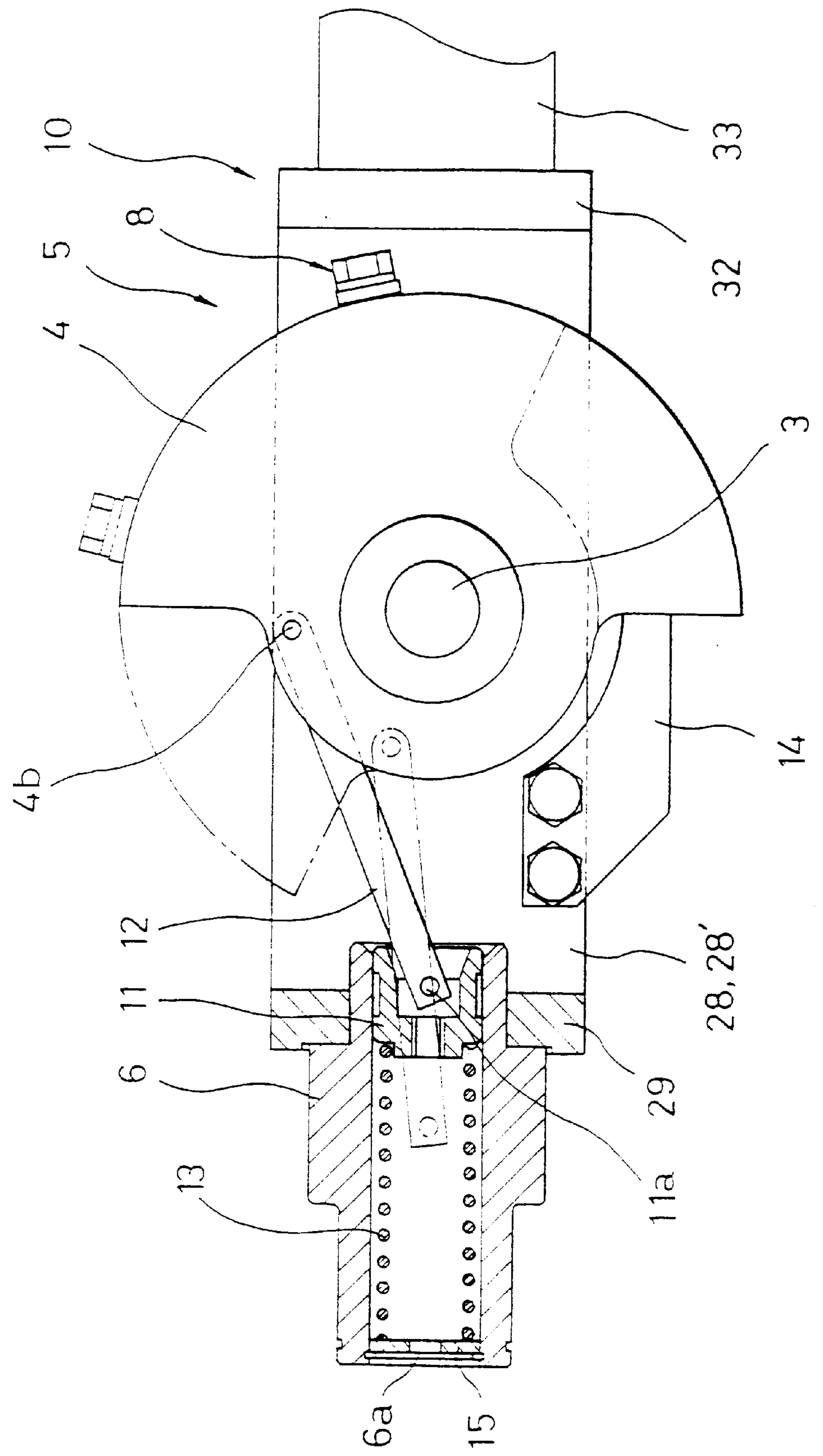
FIG. 6 is a side sectional view illustrating to magnify the constitution of a vibration generating body of FIG. 4.

FIG. 6 is an enlarged sectional view showing the structure of the vibration generating body 5. The eccentric weight 4 which has the shaft 3 perpendicular to the axis of the vibration generating shaft 10 and which is rotative around the shaft 3 of the presnt embodiment is a semi circle eccentric weight. The pilot weight 8 which is a small eccentric weight having the mass smaller than the movable eccentric weight 4 is fixed to the circumference of the eccentric weight 4.

There attached a retaining ring 6*a* in the left-hand end groove of the cylindrical guide member 6. A sliding member 11 for linear moving on the same axis as the vibration generating shaft 10 is placed in the guide member 6. One end of a connecting rod 12 is connected to the sliding member 11 with a pin 11*a*, and the other end of the connecting rod 12 is connected to the movable ecccentric weight 4 with a pin 4*b*, which acts on changing the displacement of the linear movement of the sliding member 11 into the displacement of the rotation around the shaft 3 of the vibration generating axis 10.

A coil spring that is an elastic member 13 is compressed between the sliding member 11 and the guide member 6, and it pushes the movable eccentric weight 4 in a clockwise direction of FIG. 6. A stopper 14 is placed at the lower end of the frames 28, 28'. The stopper 14 limits the rotational range of the movable eccentric weight 4 to the zero angle of the eccentric amount of the vibration generating shaft 10. Accordingly, the elastic member 13 presses the movable eccentric weight 4 so that the eccentric amount of the vibration generating shaft 10 is zero. A spacer 15 having a hole at the center is provided between the elastic member 13 and the retaining ring 6*a*. The acting force of the elastic member 13 is controlled by changing the thickness of the elastic member 13 or changing the number of the elastic member 13.

Next, the operation of the vibration generating mechanism of the first embodiment will be described.

Now, the movable eccentric weight 4, the peripheral face of which is fixed with the pilot weight 8 which is a small eccentric weight having a mass smaller than the mass of the movable eccentric weight 4, is brought into a position designated by bold lines of FIG. 6 by the pressing force of the elastic member 13 such that the amount of eccentricity of the vibration generating shaft 10 is nullified whereby the weight of gravity of the vibration generating shaft 10 is maintained to dispose substantially on the axial line of the vibration generating shaft 10.

When the hydraulic motor 7 for driving the vibration generating shaft that is the rotational driving device of the vibration generating shaft 10, is driven to rotate to a certain rotational number under this state, the movable eccentric weight 4 surpasses the moment caused by the previous loading of the elastic member 13 by the pilot weight 8, and is rotated around the pivoting shaft 3 to a maximum eccentric position designated by two-dotted chain lines of FIG. 6 (rise of vibration). The rotation of the vibration generating shaft 10 is increased and the vibratory roller is operated under a steady rotational state. When the rotation of the vibration generating shaft 10 is decreased from the steady rotational state to a certain rotational number or less, the movable eccentric weight 4 is rotated in a direction of nullifying the amount of eccentricity around the pivoting shaft 3 by the spring force of the elastic member 13 (fall of vibration) and returns to the neutral position.

In this case, the eccentric moment corresponds to m×r in the equation of calculating the vibration generating force F specified below where an eccentric mass is designated by notation m, a distance from the axial line of the vibration generating shaft to the center of gravity of the eccentric mass is designated by notation r and the angular velocity of the vibration generating shaft is designated by ω.

$$F=(m\times r)\times\omega^2$$

Figure 7:
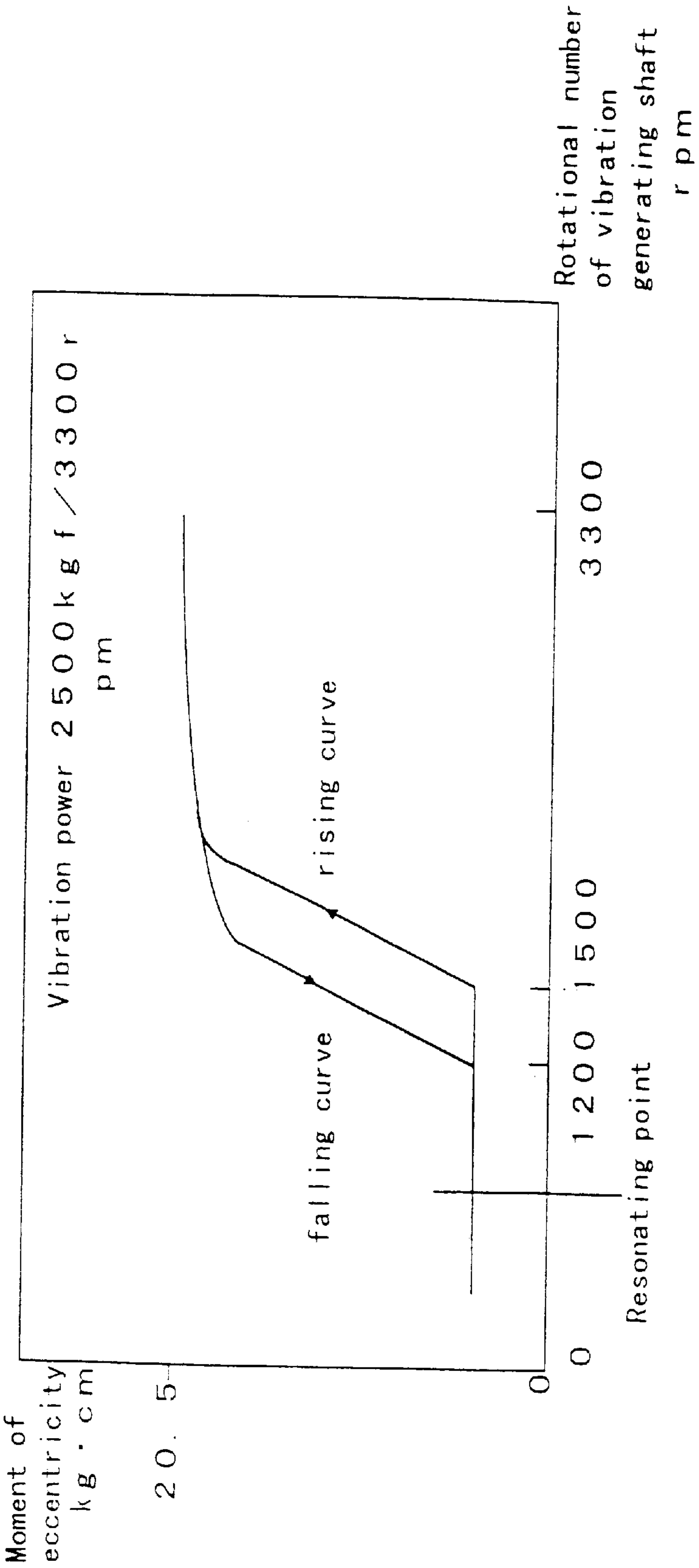
FIG. 7 is a graph in respect of a relationship between a rotational number of the vibration generating shaft and the moment of eccentricity.

FIG. 7 shows a graph in respect of a relationship between the rotational number of the vibration generating shaft and the moment of eccentricity. The moment produced by the previous loading of the elastic member 13 is adjusted previously such that rise and fall of vibration are caused at a vicinity of the rotational number of the vibration generating shaft 10 of 1200 through 1500 rpm avoiding the resonating point (600 through 800 rpm). Thereby, start and stop of vibration can be carried out without resonating the vibratory body (vibratory roller). Incidentally, paths of a rising curve and a falling curve differ by influence of a frictional force or the like caused between the sliding member 11 and the guide member 6. Further, the moment produced by the previous loading can easily be adjusted by the spacer 15 interposed between the retaining ring 6*a* of the cylindrical guide member 6 and the elastic member 13 in FIG. 6.

Figure 8:
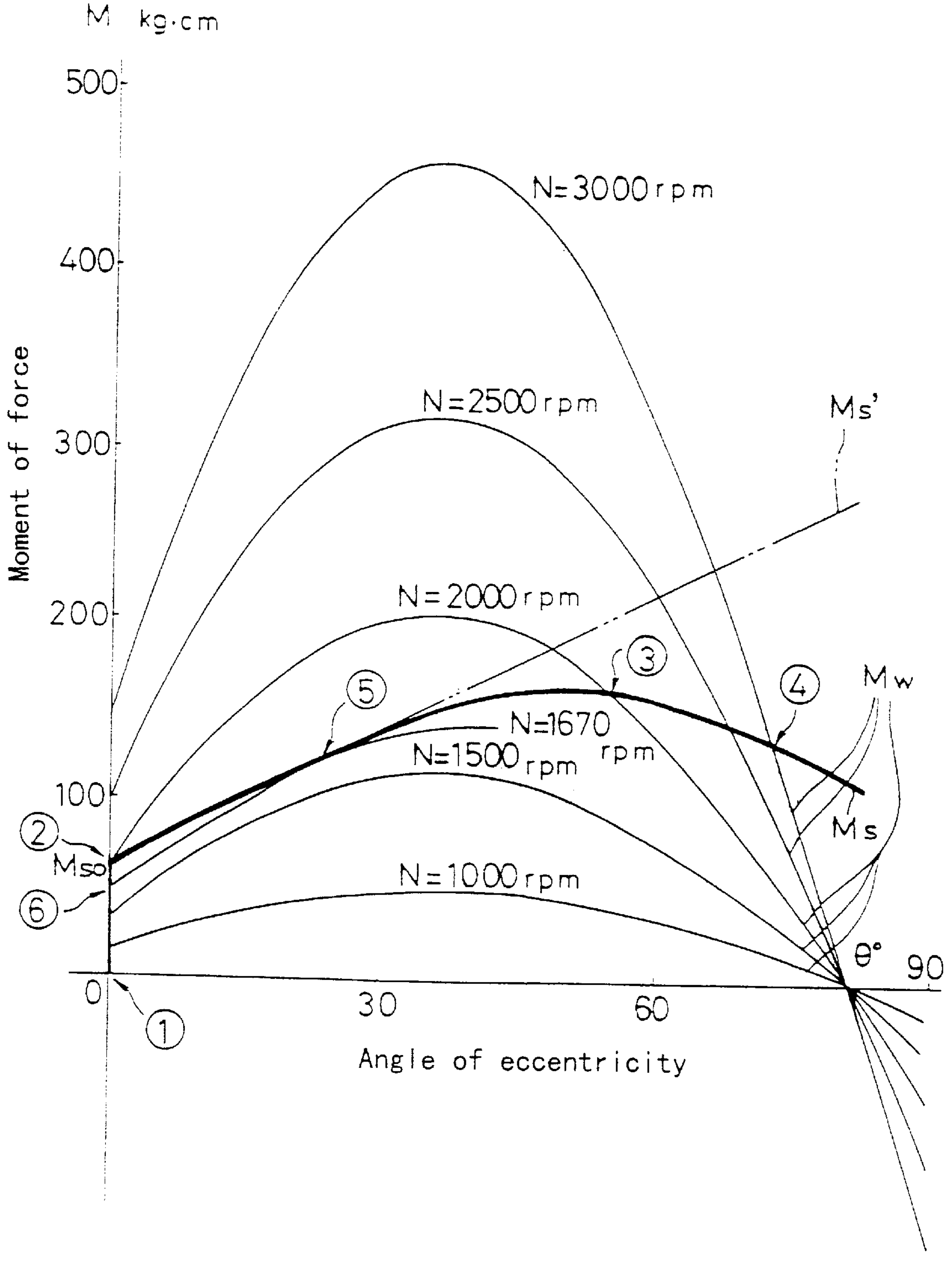
FIG. 8 shows graphs indicating a relationship between curves of a moment Mw of a force exerted around a pivoting shaft of a main weight operating in a direction of making eccentric the main weight by a pilot weight in various rotational numbers of a vibration generating shaft in respect of an angle of eccentricity of the main weight, and a moment Ms of a force exerting around the pivoting shaft of the main weight operating in a direction of preventing the main weight from being made eccentric by a pressing member (coil spring)

FIG. 8 shows graphs indicating a relationship between curves of a moment Mw of a force exerting around the axial line of the main weight operating in a direction of making the main weight eccentric by the pilot weight in respect of the angle of eccentricity of the main weight under various rotational numbers of the vibration generating shaft, and a moment Ms of a force exerting around the pivoting shaft of the main weight operating in a direction of preventing the main weight from being eccentric by the elastic member (coil spring).

The abscissa of FIG. 8 designates the angular displacement (hereinafter, referred to as angle of eccentricity) θ of the main weight and the angle of 0' is set when the main weight is disposed at a position exactly divided in two the vibration generating shaft. In this example, when the main weight is disposed at this position, the center of gravity of the vibration generating shaft is substantially disposed on the axial line of the vibration generating shaft. The ordinate designates the moment of the force exerting around the pivoting shaft of the main weight. As kinds of the moment of the force exerting around the pivoting shaft, there are a moment caused by the centrifugal force exerting on the eccentric weight and a moment caused by the self weight of the eccentric weight per se.

As is known from the publicly-known technology disclosed in Japanese Laid-open Patent Publication No. JP-53-136773, in respect of the moment caused by the centrifugal force exerting on the eccentric weight, in this example, the moment is not caused by the main weight per se since the main weight is of a semicircular shape but the moment can be caused only by the moment of the force exerted by the pilot weight. The moment caused by the self weight of the eccentric weight per se is disregarded since it is very small compared with the moment caused by the centrifugal force exerted on the pilot weight.

Further, a curve which passes through the original point, rises along the ordinate, proceeds in an oblique upper direction at a vicinity of 66 kgcm, reaches a top point at a vicinity of 160 kgcm and falls gradually, is a line of the moment Ms of the force exerting around the pivoting shaft of the main weight to return the main weight in the axial direction of the vibration generating shaft by the coil spring in the first embodiment.

In contrast thereto, straight lines passing through the original point, rising along the ordinate and proceeding in an oblique upper direction at a vicinity of 66 kgcm indicated by a two-dotted chain line rising in the right direction in FIG. 8, is a line of a moment Ms' of a force exerting around the pivoting shaft of the main weight to return the main weight in the axial direction of the vibration generating shaft in the conventional example.

By chasing movement of intersections between Mw lines and Ms line of the graphs, how the main weight is made eccentric into a steady rotational state from the state of the angle of the eccentricity of 0' when the rotational number of the vibration generating shaft is increased and how the main weight proceeds from the steady rotational state to the state of the angle of the eccentricity of 0' when the rotational number of the vibration generating shaft is decreased, will be known as follows. (circled numerals correspond to points of circled numerals in FIG. 8).

①: The angle of eccentricity is 0' when the vibration generating shaft is in a stationary state.

①-②: Although the rotational number of the vibration generating shaft is increased, the angle of the eccentricity remains at 0'.

②: When the rotational number of the vibration generating shaft reaches 2000 rpm, the moment Mw of the force by the centrifugal force of the pilot weight and the like is equal to a value of a moment Mso of a force caused by the initial pressure of the coil spring for the first time.

③: When the rotational number exceeds 2000 rpm even by a small amount, the moment Mw by the centrifugal force of the pilot weight and the like surpasses the moment Mso of the force caused by the initial pressure of the coil spring and the angle of eccentricity is changed from the state of 0' to a vicinity of an intersection of Mw line on the right side of Mw line of 2000 rpm and Ms line and the angle of eccentricity becomes substantially 55'.

③-④: As the rotational number of the vibration generating shaft is further increased, the angle of eccentricity is increased along Ms line of the moment of the force by the coil spring.

④: When the rotational number of the vibration generating shaft reaches 3000 rpm, the angle of eccentricity is substantially 72'.

④-⑤: When the rotational number of the vibration generating shaft is decreased from 3000 rpm, the angle of eccentricity is decreased along Ms line. In this case, even when the rotational number passes through 2000 rpm, the pilot weight has already been made eccentric and the moment of a force which has a large value by that amount of eccentricity is applied and therefore, the angle of eccentricity does not become 0'.

⑤: When the rotational number of the vibration generating shaft reaches 1670 rpm, the angle of eccentricity is substantially 27'.

⑥-①: When the rotational number of the vibration generating shaft is decreased from 1670 rpm, the magnitude of the moment Mw by the centrifugal force of the pilot weight and the like, is equal to or lower than the moment Mso of the force caused by the initial pressure of the coil spring and therefore, the angle of eccentricity is changed abruptly from 27' to 0'.

A line of the moment Ms' of the force exerted around the pivoting shaft of the main weight by the conventional torsional coil spring, is constituted by straight lines passing through the original point, rising along the ordinate and proportionally increasing in an oblique upper direction from a vicinity of 66 kgcm indicated by the two-dotted chain line and therefore, there causes a drawback where a large moment is operated when the main weight is made to return in the axial direction of the vibration generating shaft, the both ends of the torsional coil spring impinge alternately to the member on the side of the main body of the vibration generating shaft and the member on the side of the main weight whereby a large sound is generated and the vibration is difficult to converge. In contrast thereto, the line of the moment Ms of the force exerting around the shaft of the main weight according to the above-described first embodiment, is constituted by the curve passing through the original point, rising along the ordinate, proceeding in an oblique upper direction from a vicinity of 66 kgcm, reaching a top point at a vicinity of 160 kgcm and falling gradually and therefore, when the main weight is returned in the axial direction of the vibration generating shaft, the main weight can be returned by a small moment only by decreasing the rotational number of the vibration generating shaft by a small amount, generation of sound caused by bringing the main weight and the stopper in contact with each other is inconsiderable and vibration is converged swiftly.

The embodiment is provided with the constitution where the attachable and detachable pilot weight is attached later to the main weight in a semicircular shape such that the embodiment is easy to design or easy to adjust. However, when the main weight per se is provided with a mass and shape in correspondence with addition of the pilot weight, the pilot weight may not naturally be added thereto newly.

Second Embodiment

According to the above-described first embodiment, in the procedure of increasing the rotational number of the vibration generating shaft from null to the stationary rotational number, when the rotational number of the vibration generating shaft is equal to or lower than a predetermined rotational number (rotational number where a mechanical system including a vibratory generating mechanism is resonated), the movable eccentric weight is disposed at the neutral position and the amount of eccentricity of the vibration generating shaft is substantially nullified and when the rotational number of the vibration generating shaft exceeds sufficiently the predetermined rotational number, the position of the movable eccentric weight is located at a position in correspondence with the stationary rotational number of the vibration generating shaft. Accordingly, the amplitude of vibration in correspondence with the stationary rotational number cannot be changed. In contrast thereto, a vibratory generating mechanism shown by FIGS. 94 and 9B, FIGS. 10A and 10B and FIGS. 11A and 11B according to a second embodiment of the present invention, can select a high amplitude or a low amplitude by changing the rotational direction of a vibration generating shaft.

Figure 9:
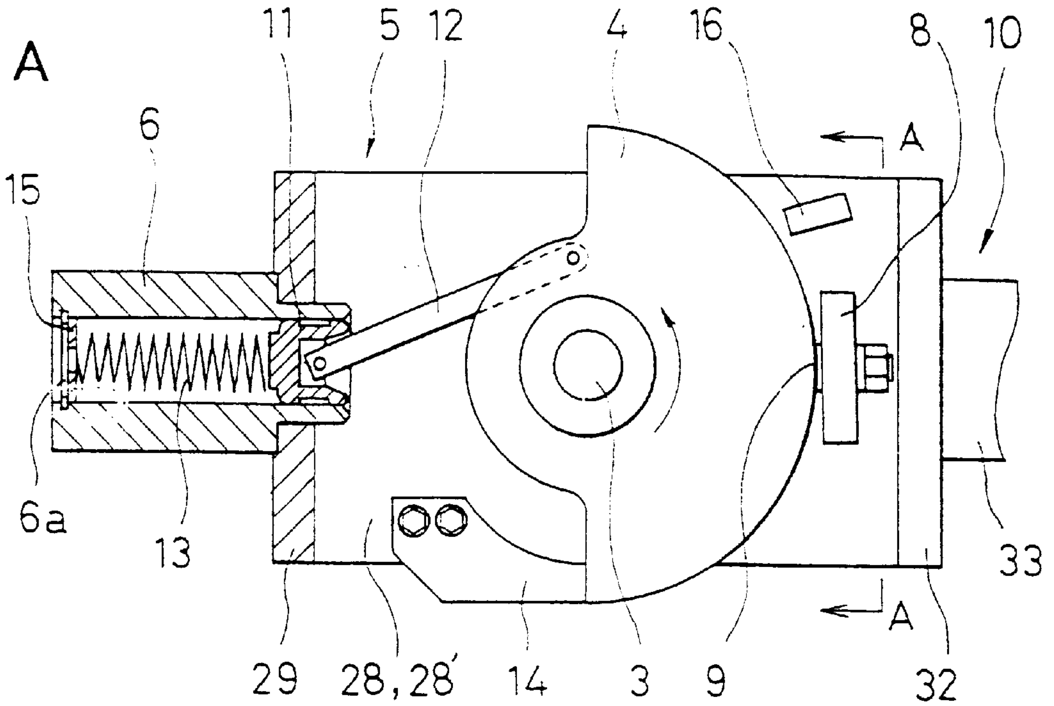
Figure 9:
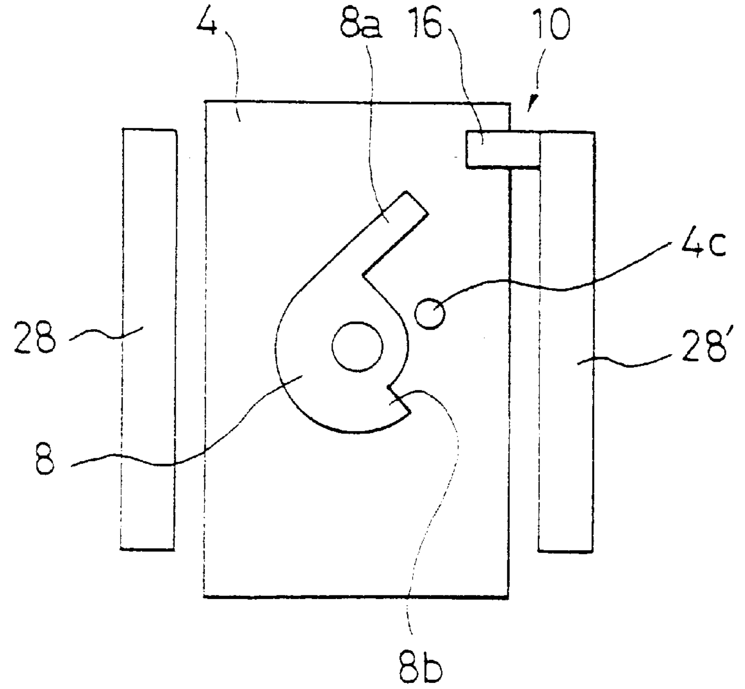

FIG. 9A is a side sectional view of a vibration generating body 5 in a state where a movable eccentric weight 4 is at a neutral position by which the amount of eccentricity of the vibration generating shaft 10 is nullified and FIG. 9B is a sectional view taken from a line A—A of FIG. 9A. An eccentric weight in a semicircular shape is used for the main weight 4 that is the movable eccentric weight also in the second embodiment. However, the pilot weight 8 provided on the peripheral face is rotatable in respect of the main weight 4 around a pivoting shaft 9 provided on the main weight 4 different from the former pivoting shaft 3. Further, the movable pilot weight 8 is provided with two long and short stopper receivers 8*a* and 8*b* having different lengths from the pivoting shaft in the radius direction. A stopper 4*c* is provided on the main weight 4, when the vibration generating shaft 10 is rotated in the anticlockwise direction of FIG. 9B, the stopper 4*c* is in abutment with the stopper receiver 8*a* on one side of the pilot weight 8 and further, when the vibration generating shaft 10 is rotated in the clockwise direction, the stopper 4*c* is in abutment with the stopper receiver 8*b* on the other side. Further, a stopper 16 is formed at one of the support frames 28 and 28' axially supporting pivotably the main weight 4. The stopper 16 is in abutment with only the stopper receiver 8*a* on one side having a longer length in the radius direction in the two stopper receivers 8*a* and 8*b* of the pilot weight 8 and does not interfere with the stopper receiver 8*b* on the other side having a shorter length in the radius direction.

Figure 10:
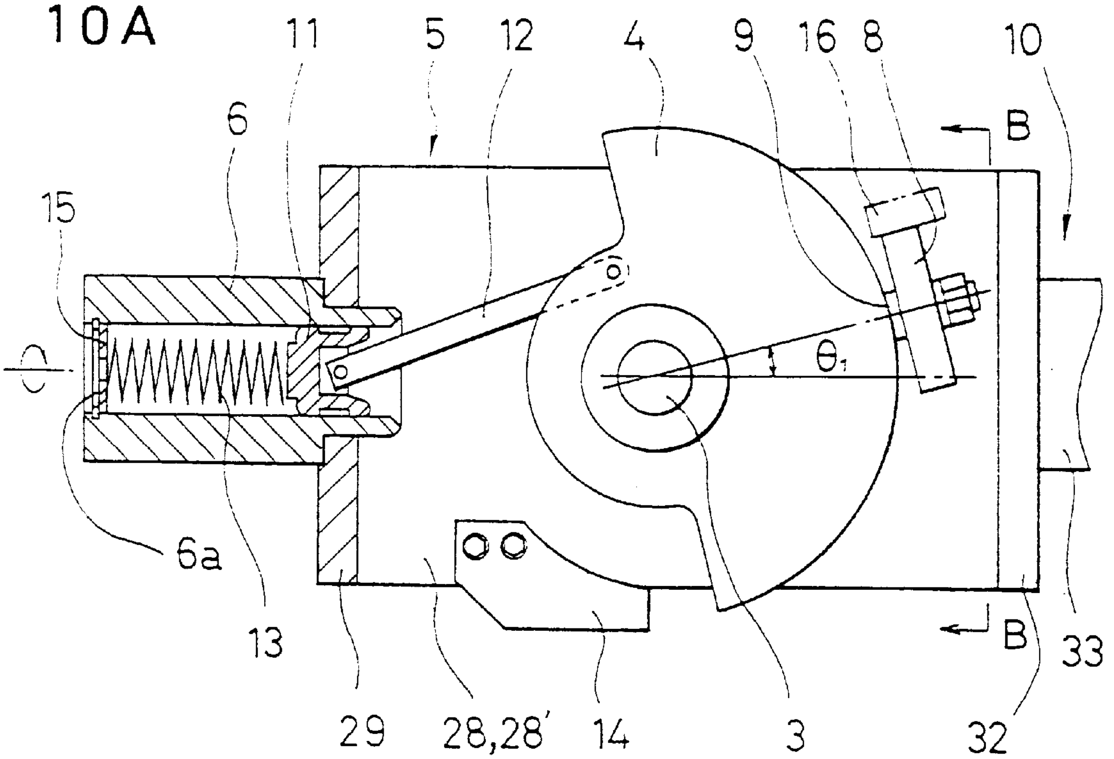
Figure 10:
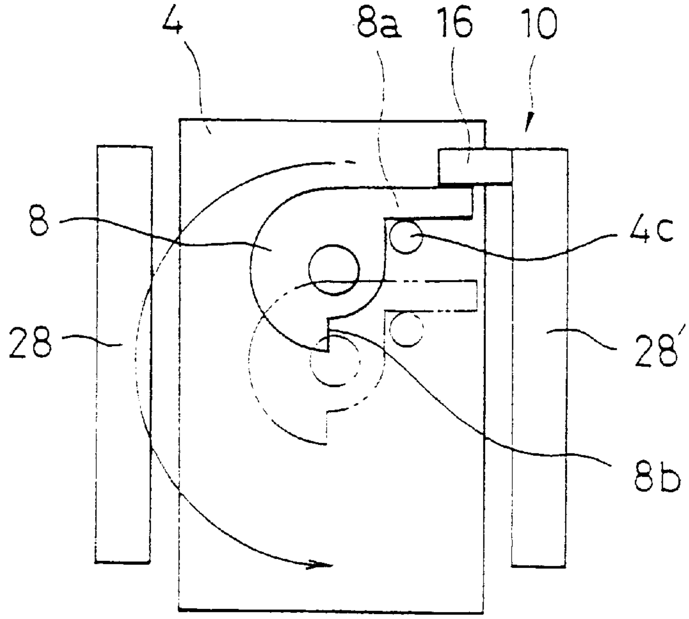

Now, when the vibration generating shaft 10 starts rotating in the anticlockwise direction from the stationary state as shown by FIG. 10B by driving the hydraulic motor 7 for driving the vibration generating shaft that is the rotational driving device of the vibration generating shaft, the pilot weight 8 is rotated in the clockwise direction by inertia as shown by FIG. 10B, the stopper receiver 8*a* having a longer length in the radius direction of the pilot weight 8 is in abutment with the stopper 4*c* fixed to the main weight 4, the pilot weight 8 is shifted upwardly with the pivoting shaft 9 in FIG. 9A as a boundary at the rotational position and the centrifugal force in the direction is exerted on the pilot weight 8. When the vibration generating shaft 10 is provided with a set rotational number under the state, the rotational moment of the main weight by the pilot weight 8 surpasses the rotational moment caused by the previous loading of the elastic member 13 and the main weight 4 starts rotating around the pivoting shaft 3 in the direction of increasing the moment of eccentricity. When the angle of eccentricity reaches an angle $\theta_1$ of FIG. 10A, the pilot weight 8 is in abutment with the stopper 16 formed at the vibration generating shaft 10, further rotation of the main weight 4 around the pivoting shaft 3 is limited and the moment of eccentricity is brought into a state of a low amplitude.

Figure 11:
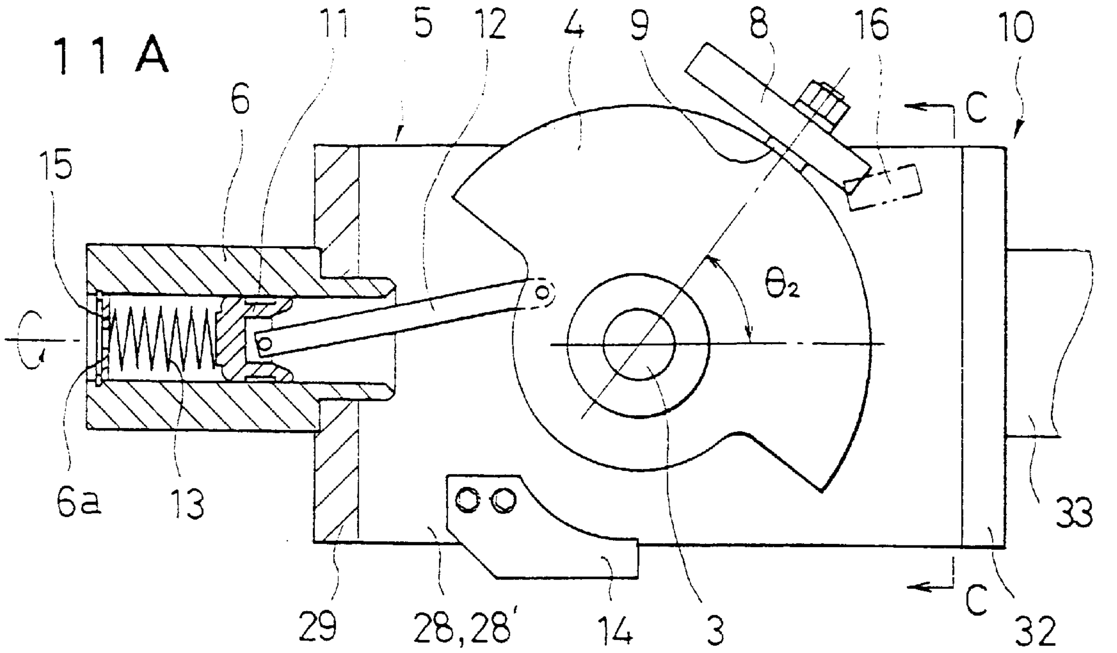
Figure 11:
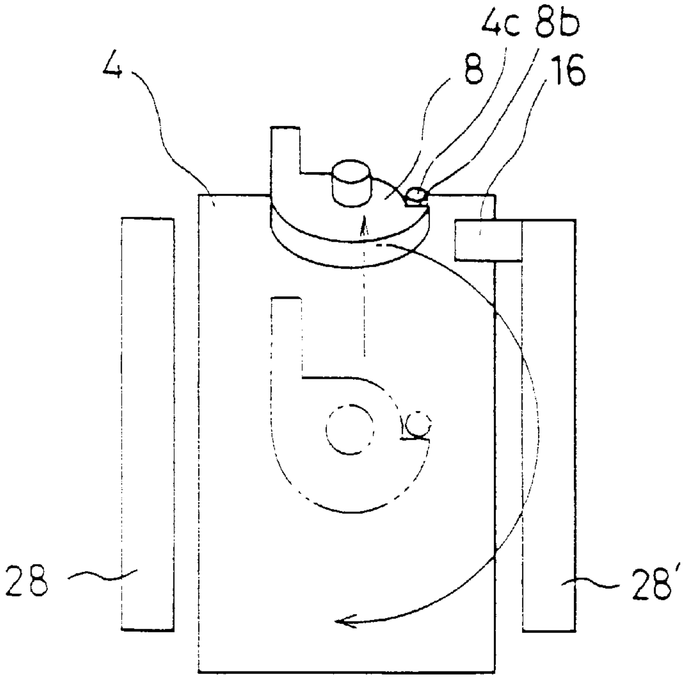

Meanwhile, when the vibration generating shaft 10 starts rotating in the clockwise direction from the stationary state as shown by FIG. 11B, the pilot weight 8 is rotated in the anticlockwise direction by inertia, the stopper receiver 8*b* having a shorter length in the radius direction of the pilot weight 8 is in abutment with the stopper 4*c* fixed on the main weight 4, the pilot weight 8 is shifted upwardly with the pivoting shaft 9 in FIG. 9A as a boundary at the rotational position and a centrifugal force in the direction is exerted on the pilot weight B. Under this state, since the length in the radius direction of the stopper receiver 8*b* of the pilot weight 8 is made shorter, even when the main weight 4 starts rotating around the pivoting shaft 3 in the direction of increasing the moment of eccentricity, the pilot weight 8 is not brought into contact with the stopper 16 formed at the vibration generating shaft 10 but the main weight 4 is rotated around the pivoting shaft 3 to pass by the stopper member 16 until the angle of eccentricity reaches an angle $\theta_2$ of FIG. 11A that is a position in correspondence with the stationary rotational number of the vibration generating shaft, that is, to a position where a moment of a force around the pivoting shaft 3 caused by a centrifugal force exerted on the pilot weight 8 at the stationary rotational number of the vibration generating shaft and a moment of a force returning the main weight to the neutral position by the spring of the elastic member 13, are balanced. Accordingly, the moment of eccentricity is brought into the state of a high amplitude.

Figure 12:
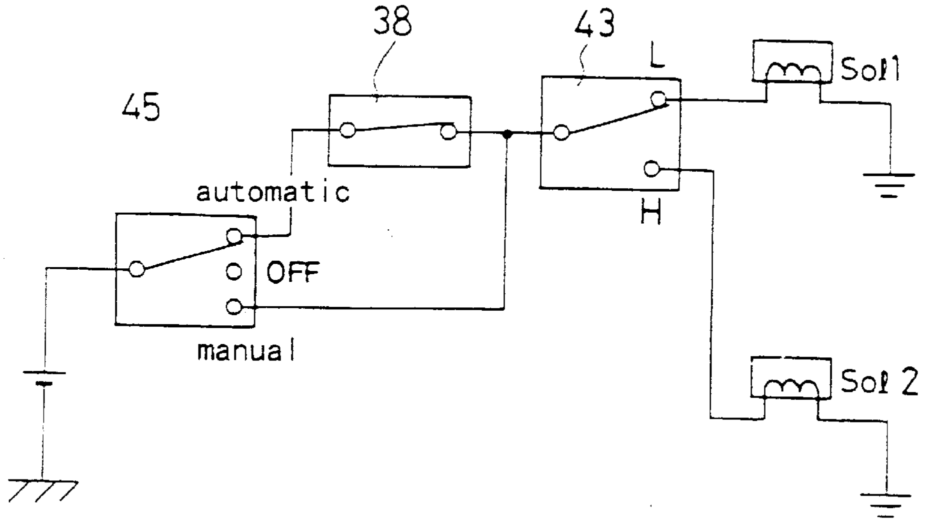
FIG. 12 is a signal circuit diagram used in the vibratory generating mechanism according to the second embodiment of the present invention.
Figure 13:
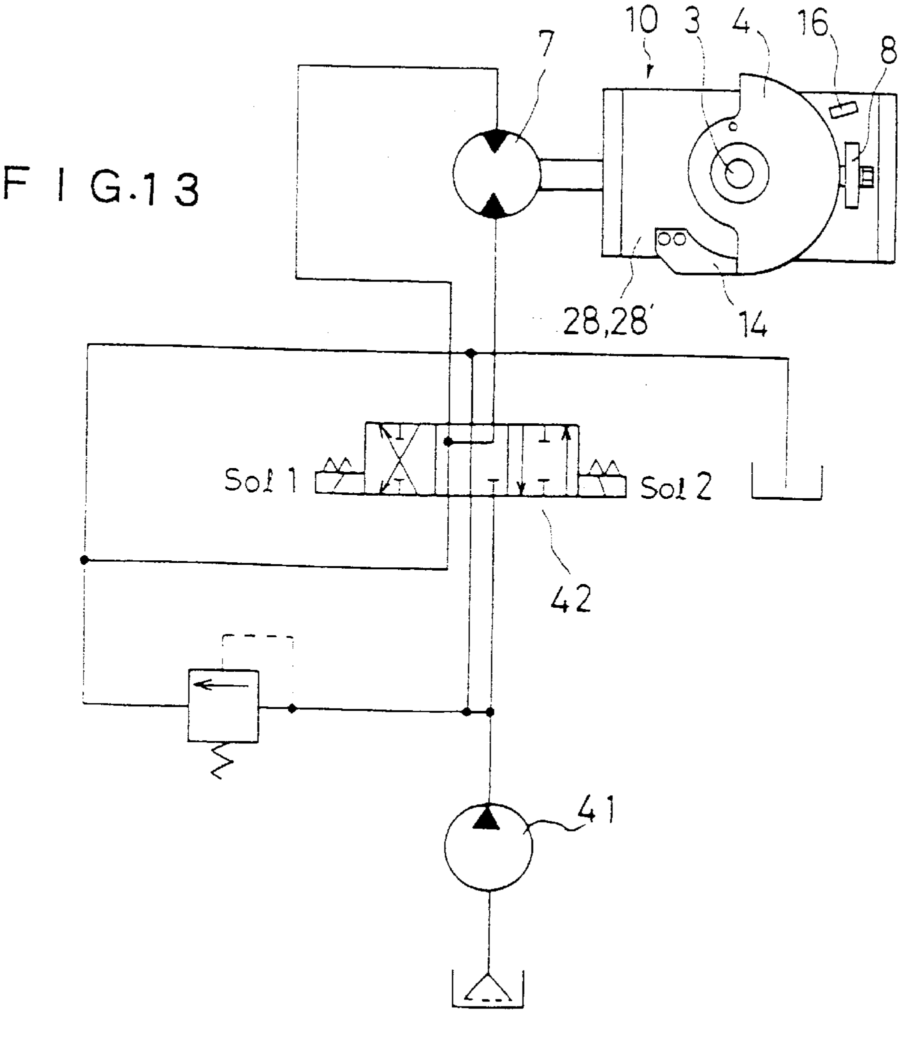
FIG. 13 is a hydraulic pressure circuit diagram used in the vibratory generating mechanism according to the second embodiment of the present invention.

In any cases of the rotational directions of the vibration generating shaft 10, when the rotational number is decreased from the steady rotational state and reaches a certain rotational number or lower, the movable eccentric weight 4 is rotated around the pivoting shaft 3 and is returned to the neutral position shown by FIGS. 9A and 9B where the amount of eccentricity of the vibration generating shaft 10 is nullified by a spring force of the elastic member 13. The mechanism in which the moment caused by the previous loading of the elastic member 13 is previously adjusted such that rise and fall of vibration are caused at a vicinity of the rotational number of the vibration generating shaft 10 of 1200 through 1500 rpm avoiding the resonating point of 600 through 800 rpm as shown by FIG. 7 whereby starting and stopping vibration without resonating the vibratory body (vibratory roller), is common to the mechanism in the first embodiment. FIG. 12 and FIG. 13 are respectively a signal circuit diagram and a hydraulic pressure circuit diagram used in the vibratory generating mechanism according to the second embodiment of the present invention. In a hydraulic pressure supply circuit connected to a hydraulic pump 41 for supplying hydraulic pressure to the hydraulic motor 7 for driving the vibration generating shaft, an amplitude changeover switch 43 for operating an electromagnetic valve 42 that is a switch valve is connected thereto along with a neutral position detecting limit switch 38 and by switching the changeover switch 43, the forward and rearward rotational directions of the hydraulic motor 7 for driving the vibration generating shaft can be switched by switching the direction of supplying hydraulic pressure. The rotational driving force of the hydraulic motor 7 for driving the vibration generating shaft is transmitted to the vibration generating shaft 10 connected to an output shaft thereof and drives to rotate the vibration generating shaft 10 in a direction the same as the rotational direction of the hydraulic motor 7 for driving the vibration generating shaft. The neutral position detecting limit switch 38 is a switch that is made OFF (normally ON) when a fore and aft traveling lever, not illustrated, that is an operation lever of traveling is operated to a neutral position (stationary position), in cooperation with the lever operation by means of a cam or the like.

The amplitude changeover switch 43 selects either of a low amplitude (L) and a high amplitude (H) by the switching operation and transmits a signal to either of electromagnetic coils Sol, and Sol2 of the electromagnetic valve 42. When the changeover switch 43 is selected to the low amplitude (L), the signal is transmitted to the electromagnetic coil Sol, of the electromagnetic valve 42 and pressurized oil is supplied, for example, in the forward direction to the hydraulic motor 7 for driving the vibration generating shaft whereby the vibration generating shaft 10 is rotated in the forward direction. By contrast, when the amplitude changeover switch 43 is selected to the high amplitude (H), the signal is transmitted to the electromagnetic coil $Sol_2$ of the electromagnetic valve 42, the pressurized oil is supplied in the rearward direction to the hydraulic motor 7 for driving the vibration generating shaft whereby the vibration generating shaft 10 is rotated in the rearward direction. Incidentally, notation 45 of FIG. 12 designates a changeover switch for switching an automatic mode and a manual mode.

Further, as has been explained in the above-described first embodiment, when the main weight 4 is provided with a semicircular shape (including combinations of similar axisymmetrical semicircular shapes), as disclosed in Japanese Unexamined Patent Publication No. JP-53-136773, even if the vibration generating shaft is rotated, a moment of a force for rotating around the pivoting shaft 3 by the operation of a centrifugal force is not caused. Accordingly, when the main weight 4 is moved around the pivoting shaft 3, the main weight 4 is not moved against the moment of the force by the centrifugal force of the main weight 4 and therefore, the force required for adjusting the rotational position of the main weight 4 is very small whereby the sensitivity of the movement of the main weight 4 in respect of the movement of the pilot weight 8 is promoted, which facilitates the amplitude switching and which is further effective.

As described above, according to the second embodiment, the switching of the high amplitude and the low amplitude is carried out by switching the rotational direction of the vibration generating shaft and when the rotation on the side of the low amplitude is carried out, before reaching the stationary rotational number, the main weight is in abutment with the stopper and a further large angle of eccentricity is not produced and the amplitude is restricted to the low value. Graphs showing a relationship of the curve of the moment Mw of the force exerting around the pivoting shaft of the main weight in respect of the angle of eccentricity of the main weight at a predetermined rotational number of the vibration generating shaft in the case of the high amplitude and the moment Ms of the force exerting around the pivoting shaft of the main weight, are similar to the curves shown by FIG. 8.

Figure 14:
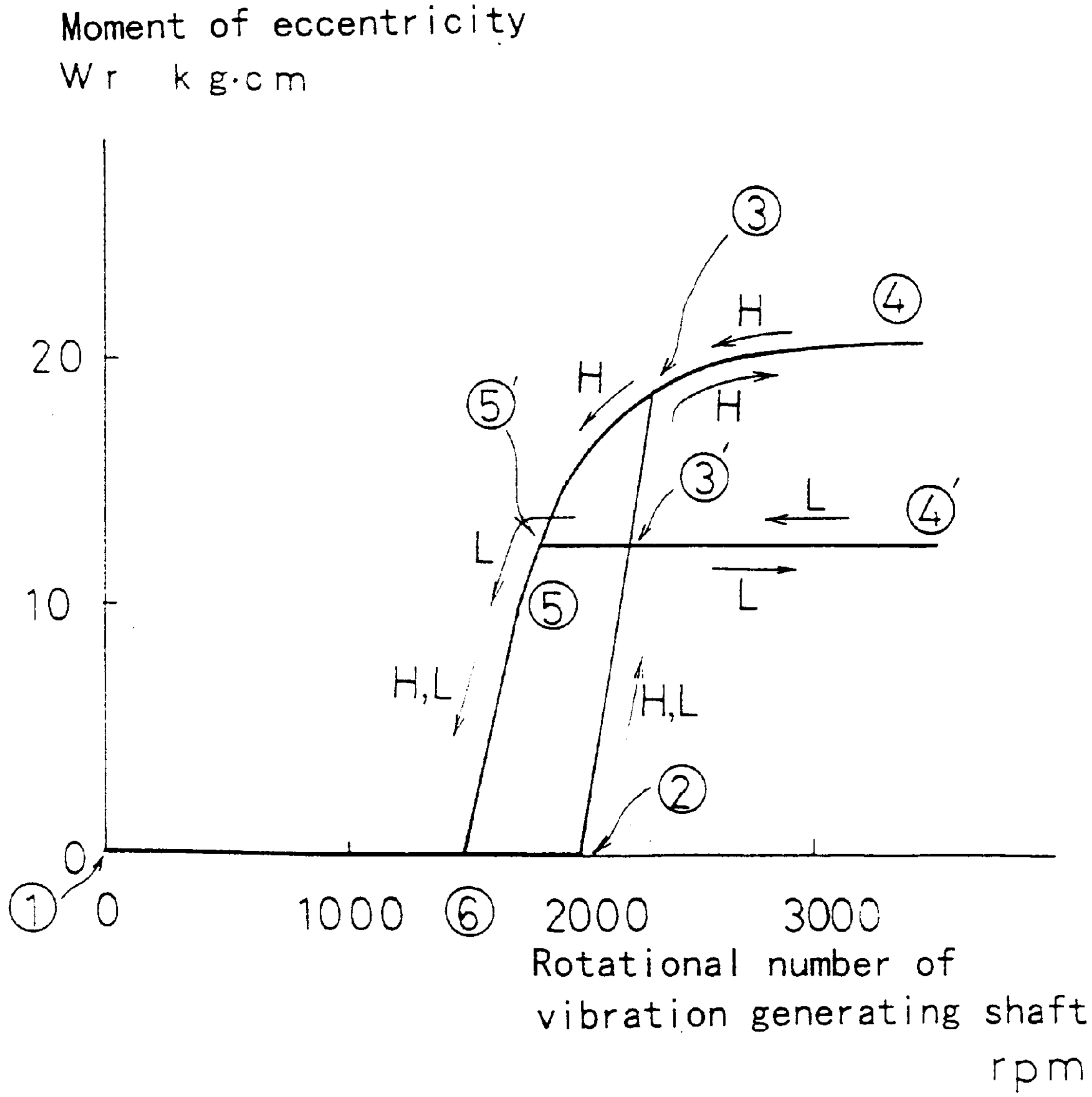
FIG. 14 is a graph of a procedure of a rotational number of a vibration generating shaft and a moment of eccentricity caused in the cases of a high amplitude and a low amplitude in the vibratory generating mechanism according to the second embodiment of the present invention.

FIG. 14 is a graph showing the procedure of the rotational number of the vibration generating shaft and the moment of eccentricity according to the second embodiment.

An explanation will be given of the procedure of the moment of eccentricity in reference to FIG. 14 as follows.

A. Procedure of moment of eccentricity in respect of rotational number of vibration generating shaft when rotated to high amplitude side:

①: When the vibration generating shaft is in a stationary state, the moment of eccentricity is 0 kgcm.

①-②: Although the rotational number of the vibration generating shaft is increased, the moment of eccentricity remains at 0 kgcm.

②: When the rotational number of the vibration generating shaft reaches 2000 rpm, the moment Mw of the force by a centrifugal force of the pilot weight or the like is equal to the value of the moment Mso of the force caused by the initial pressure of the coil spring (FIG. 8) for the first time and with the rotational number as a boundary, the main weight 4 is rotated from the neutral position around the pivoting shaft 3 and the moment of the eccentricity is also changed.

③: When the rotational number exceeds 2000 rpm, the moment of eccentricity jumps to a value at a vicinity of 18 kgcm.

③-④: As the rotational number of the vibration generating shaft is further increased, the moment of eccentricity rises along a curve proceeding in an oblique right direction.

④: When the rotational number of the vibration generating shaft reaches 3000 rpm, the moment of eccentricity becomes a value at a vicinity of 20 kgcm.

④-⑤: When the rotational number of the vibration generating shaft is lowered from 3000 rpm, the rotational number proceeds the curve which the rotational number has passed through in steps ③-④, in the reverse direction, however, even if the rotational number passes through 2000 rpm, different from the path when the rotation is increased, the moment of eccentricity does not become 0 kgcm abruptly.

⑤: When the rotational number of the vibration generating shaft reaches 1670 rpm, the moment of eccentricity becomes a value at a vicinity of 10 kgcm.

⑥-①: When the rotational number of the vibration generating shaft is lowered from 1670 rpm, the moment of eccentricity becomes 0 kgcm abruptly. Thereafter, the value is maintained until the rotational number of the vibration generating shaft becomes 0 rpm.

B. Procedure of moment of eccentricity in respect of rotational number of vibration generating shaft when rotated to low amplitude side:

①: When the vibration generating shaft is in a stationary state, the moment of eccentricity is 0 kgcm.

①-②: Although the rotational number of the vibration generating shaft is increased, the moment of eccentricity remains at 0 kgcm.

②: When the rotational number of the vibration generating shaft reaches 2000 rpm, the moment Mw of the force by a centrifugal force of the pilot weight or the like is equal to the value of the moment Mso of the force caused by the initial pressure of the coil spring (FIG. 8) for the first time, and with the rotational number as a boundary, the main weight 4 is rotated from the neutral position around the pivoting shaft 3 and the moment of eccentricity is also changed.

③': When the rotational number exceeds 2000 rpm even by a small amount, the moment of eccentricity jumps up, however, different from the case of the high amplitude, the angle of eccentricity of the main weight is limited by the stopper and therefore, the moment of eccentricity remains at 12 kgcm.

③'-④': Even when the rotational number of the vibration generating shaft is further increased, the moment of eccentricity maintains at the value of 12 kgcm.

④': Even when the rotational number of the vibration generating shaft reaches 3000 rpm, the moment of eccentricity remains at the value of 12 kgcm.

④'-⑤': When the rotational number of the vibration generating shaft is lowered from 3000 rpm, although the rotational number proceeds the straight line which the rotational number has passed in steps ③'-④' in the reverse direction, even when the rotational number passes through 2000 rpm, different from the path when the rotation is increased, the moment of eccentricity maintains at the value of 12 kgcm.

⑤'-⑥: When the rotational number of the vibration generating shaft is lowered from a vicinity of 1800 rpm, the main weight leaves the stopper and the moment of eccentricity proceeds the same path in lowering the rotational number of the vibration generating shaft in the case of the high amplitude.

⑥: When the rotational number of the vibration generating shaft reaches 1670 rpm, the moment of eccentricity becomes a value at a vicinity of 10 kgcm.

⑥-①: When the rotational number of the vibration generating shaft is lowered from 1670 rpm, the moment of eccentricity becomes 0 kgcm abruptly. Thereafter, the value is maintained until the rotational number of the vibration generating shaft becomes 0 rpm.

Further, in the case of this example, the vibration number of the vibration generating device (unit: vpm [vibration per minute]) is equal to the value of the rotational number (unit: rpm) of the vibration generating device.

Further, the amplitude of vibration is substantially proportional to the moment of eccentricity of the vibration generating shaft although the value may be varied slightly depending on the object of vibration. Therefore, the change pattern of the graph in respect of the relationship between the rotational number of the vibration generating shaft and the amplitude of vibration also becomes substantially the pattern as shown by FIG. 14.

In the case of the vibratory roller, the resonating point of the compacting wheel falls in a range of 600 through 800 rpm of the rotational number of the vibration generating shaft and therefore, when the motion of the main weight in respect of the rotational number of the vibration generating shaft 10 is changed in accordance with the description in reference to FIG. 8 and FIG. 14, the center of gravity of the vibration generating shaft is held substantially on the axial line of the vibration generating shaft by the previous loading of the elastic member 13 when the vibration generating shaft is started, when the vibration generating shaft is stationary and when the rotational number passes through the resonating point and no resonance is caused. When the resonating point is provided with other value, the resonance can similarly be prevented by selecting an elastic member having a pertinent spring constant.

Incidentally, in fact, it is difficult to dispose the center of gravity of the vibration generating shaft completely on the axial line of the vibration generating shaft and in an actual example, when the center of gravity of the vibration generating shaft is only disposed substantially on the axial line of the vibration generating shaft, the roll is not vibrated considerably by passing through the resonating point. Therefore, according to this specification, positioning of the center of gravity of the vibration generating shaft "substantially" on the axial line of the vibration generating shaft, signifies a phenomenon where the amplitude is substantially nullified by positioning the center of gravity of the vibration generating shaft on the axial line of the vibration generating shaft completely or substantially.

Although according to the above-described respective embodiments, an explanation has been given of the case where the vibratory generating mechanism according to the present invention is used in the vibratory roller, the present invention is not limited only to the use but achieves an effect sufficiently by being used in vibration machines such as a vibration type compacting machine, a vibration pile driver and the like including the vibratory roller.

According to the vibratory generating mechanism of the present invention explained above, the stopper for restricting the pivoting range of the movable eccentric weight from one side to the angle where the amount of eccentricity of the vibration generating shaft is nullified, is provided to the vibration generating shaft, the elastic member maintains the movable eccentric weight such that the amount of eccentricity of the vibration generating shaft is nullified and when the vibration generating shaft is rotated to a certain rotational number, the movable eccentric weight surpasses the moment caused by the previous loading of the elastic member. Further, the movable eccentric weight is rotated to a point where the moment of the force for increasing the amount of eccentricity exerted to the movable eccentric weight at the stationary rotational number of the vibration generating shaft and the moment caused by the previous loading of the elastic member, are balanced. Further, when the rotation of the vibration generating shaft is lowered from the steady rotational state to a certain rotational number or lower, the movable eccentric weight is rotated around the pivoting shaft in a direction of nullifying the amount of eccentricity by the spring force of the elastic member. By previously adjusting the moment caused by the previous loading of the elastic member by avoiding the resonating point, the vibration can be started and stopped without resonating a mechanical system including the vibratory generating mechanism (roll of vibratory roller or the like).

Further, the present invention can resolve the drawback of the conventional technology which has been pointed out as the first unsolved problem in the constitution where the elastic member comprising the torsional coil spring that is the conventional technology, sandwiches the member on the side of the main body of the vibration generating shaft and the member on the side of the main weight by both ends thereof and the center of gravity of the vibration generating shaft is maintained to dispose substantially on the axial line of the vibration generating shaft, in which when the vibration generating shaft is rotated at a high speed, the torsional coil spring is pressed to the side of an end plate on the external side by the centrifugal force and the torsional coil spring is worn by being brought into abrasive contact with the end plate.

Further, there has been the drawback of the conventional technology as the unsolved second problem in which the rotational angle of the main weight is in proportion to the moment of recovery and therefore, a considerable moment is operated in the return operation, the both ends of the torsional coil spring impinge alternately to the member on the side of the main body of the vibration generating shaft and the member on the side of the main weight whereby a large sound is generated. According to the present invention, the present invention is constituted by the link mechanism comprising the connecting rod transforming the displacement of the linear movement of the sliding member into the displacement of the rotational movement around the pivoting shaft of the vibration generating shaft, the rotational angle of the main weight is not proportional to the moment of returning operation and the line of the moment Ms of the recovery force exerted around the pivoting shaft of the main weight is constituted by a curve in a shape of a mountain having a moderate slope and therefore, even when the main weight returns dynamically in the axial direction of the vibration generating shaft, the main weight does not return to the side of the stopper-abruptly. As a result, generation of sound caused by the impingement between the main weight and the stopper is inconsiderable and useless vibration is restrained.

Further, when the vibratory roller is provided with the above-described vibratory generating mechanism, in the case where as a normal procedure, the vibratory roller is started and stopped travelling in the vibratory compacting operation, the vibration is stopped such that the compacting face is not partially sunk significantly, in that case, the roll is not resonated and therefore, even small wavy irregularities are not caused on the compacted road surface and vibration hazard caused by passing through the resonating point can be avoided. Further, switching of the high amplitude and the low amplitude can be performed.

What is claimed is:

1. A vibratory generating mechanism having a pivoting shaft in a direction orthogonal to an axial line of a vibration generating shaft, having a movable eccentric weight rotatable around the pivoting shaft and generating vibration by rotating the vibration generating shaft, said vibratory generating mechanism comprising:

a rotational driving device of the vibration generating shaft;

a sliding member capable of moving linearly on the axial line of the vibration generating shaft along a guide member on one side of the vibration generating shaft;

a connecting rod one end of which is connected to the sliding member and other end of which is connected to the movable eccentric weight for transforming a displacement of a linear movement of the sliding member into a displacement of a rotational movement around the pivoting shaft of the vibration generating shaft;

a stopper for restricting a range of pivoting the movable eccentric weight to an angle nullifying an amount of eccentricity of the vibration generating shaft only from one side; and an elastic member interposed between the sliding member and the guide member for elastic the movable eccentric weight such that the amount of eccentricity of the vibration generating shaft is nullified.

2. The vibratory generating mechanism according to claim 1, wherein the elastic member is a coil spring.

3. The vibratory generating mechanism according to claim 1, wherein the pivoting shaft for axially supporting the movable eccentric weight is fixed to span support frames arranged separately to oppose each other.

4. The vibratory generating mechanism according to claim 1, wherein the movable eccentric weight constitutes a main weight and a pilot weight which is a small eccentric weight having a mass smaller than a mass of the movable eccentric weight is provided on the main weight.

5. The vibratory generating mechanism according to claim 4, wherein the pilot weight is made pivotable in respect of the main weight and an amplitude of vibration is made variable by rotating the vibration generating shaft by switching a direction of rotating thereof.

6. The vibratory generating mechanism according to claim 5, wherein two stopper receivers having different lengths from a pivoting axial center thereof in a radius direction are provided, a stopper for engaging with the two stoppers is provided on the main weight and a stopper having a dimension capable of engaging only one of the two stopper receivers of the pilot weight is provided at the support frames axially and rotatably supporting the main weight.

7. A vibratory roller having the vibratory generating mechanism according to claim 1.

* * * * *